(12) United States Patent
Talvensaari et al.

(10) Patent No.: US 9,444,813 B1
(45) Date of Patent: *Sep. 13, 2016

(54) TOKEN-BASED SECURITY FOR REMOTE RESOURCES

(71) Applicant: WOWZA MEDIA SYSTEMS, LLC, Golden, CO (US)

(72) Inventors: Michael Dean Talvensaari, Los Gatos, CA (US); Ian Zenoni, Highlands Ranch, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,370

(22) Filed: Aug. 10, 2015

Related U.S. Application Data (63) Continuation of application No. 14/630,334, filed on Feb. 24, 2015, now Pat. No. 9,135,412.

(51) Int. Cl.
  *G06F 21/44* (2013.01)
  *H04L 29/06* (2006.01)
  *H04L 12/24* (2006.01)

(52) U.S. Cl.
  CPC ....... *H04L 63/0838* (2013.01); *H04L 41/0816* (2013.01); *H04L 63/168* (2013.01)

(58) Field of Classification Search
  CPC ........... G06F 21/10; G06F 2221/0711; H04L 63/168
  See application file for complete search history.

(56) References Cited

U.S. PATENT DOCUMENTS

| 6,088,451 | A | 7/2000 | He et al. |
|---|---|---|---|
| 6,427,006 | B1 | 7/2002 | Reding et al. |
| 7,363,499 | B2 | 4/2008 | Perlman |
| 7,668,830 | B2 | 2/2010 | Hakala |
| 7,711,647 | B2 | 5/2010 | Gunaseelan et al. |
| 8,122,100 | B2 | 2/2012 | Raciborski et al. |
| 8,627,432 | B2 | 1/2014 | Dachiraju et al. |
| 8,640,229 | B1 | 1/2014 | Riegel et al. |

(Continued)

FOREIGN PATENT DOCUMENTS

| KR | 1020010091080 A | 10/2001 |
|---|---|---|
| KR | 1020060090044 A | 8/2006 |

(Continued)

OTHER PUBLICATIONS

"Security Mechanisms", https://metro.dev.java.net/guide/Security_Mechanisms.html, Nov. 19, 2008, 3 pages.

(Continued)

*Primary Examiner* — Izunna Okeke
(74) *Attorney, Agent, or Firm* — Toler Law Group, PC (57) ABSTRACT

Systems and methods of token-based protection for remote resources are disclosed. For example, a method may include receiving, at a second computing device, a configuration message from a first computing device. The configuration message includes information to configure a resource at the second computing device. For example, the resource may be a cloud transcoder. The method also includes generating, at the second computing device, a short token that enables the first computing device to access the resource. For example, the short token may be used to receive a long token that can be used to send application programming interface (API) requests to the cloud transcoder.

19 Claims, 4 Drawing Sheets

(56) References Cited

U.S. PATENT DOCUMENTS

| | | |
|---|---|---|
| 8,719,582 B2 | 5/2014 | Neystadt et al. |
| 8,997,199 B2 | 3/2015 | Riegel et al. |
| 2001/0051996 A1 | 12/2001 | Cooper et al. |
| 2002/0077985 A1 | 6/2002 | Kobata et al. |
| 2002/0141594 A1 | 10/2002 | MacKenzie et al. |
| 2002/0147929 A1 | 10/2002 | Rose |
| 2003/0014630 A1 | 1/2003 | Spencer et al. |
| 2003/0014750 A1 | 1/2003 | Kamen |
| 2003/0105835 A1 | 6/2003 | Hori et al. |
| 2003/0144869 A1 | 7/2003 | Fung et al. |
| 2004/0024688 A1 | 2/2004 | Bi et al. |
| 2005/0005146 A1 | 1/2005 | Kryeziu |
| 2005/0099612 A1 | 5/2005 | Kirovski |
| 2005/0165937 A1 | 7/2005 | Genevois |
| 2006/0080546 A1 | 4/2006 | Brannon et al. |
| 2008/0313150 A1 | 12/2008 | Penner et al. |
| 2010/0228989 A1 | 9/2010 | Neystadt et al. |
| 2011/0047566 A1 | 2/2011 | Matuchniak et al. |
| 2011/0197237 A1* | 8/2011 | Turner ............... H04N 21/2343 725/78 |
| 2011/0231555 A1 | 9/2011 | Ebrahimi et al. |
| 2012/0324552 A1 | 12/2012 | Padala et al. |
| 2013/0067109 A1 | 3/2013 | Dong et al. |
| 2014/0047522 A1 | 2/2014 | Chin et al. |
| 2014/0281007 A1 | 9/2014 | Lemmons et al. |
| 2015/0026468 A1 | 1/2015 | Riegel et al. |

FOREIGN PATENT DOCUMENTS

| | | |
|---|---|---|
| WO | 2005121994 A1 | 12/2005 |
| WO | 2006112617 A1 | 10/2006 |

OTHER PUBLICATIONS

"How to protect RTMP streaming using SecureToken ModuleSecureToken)", http://www.wowza.com/forums/content.php?450, published Nov. 8, 2012, 4 pages.

"How to add SecureToken protection to LongTail JW Player 5 and 6", http://www.wowza.com/forums/content/php251, published on Oct. 1, 2010, 5 pages.

Shin et al., "Position Paper for W3C DRM Workshop", http://www.w3.org/2000/12/drm-ws/pp/accessticket.html, printed Nov. 19, 2008, 6 pages.

Nair et al., "Enabling DRM-preserving Digital Content Redistribution", Seventh IEEE International Conference on E-Commerce Technology, Jul. 19-22, 2005, IEEE, 8 pages.

"Wowza Pro Media Security", http://downloads.wowza.com/hide457892_WowzaMediaServer-2-0-0-preview1/WowzaProMediaSecurity_UsersGuide.pdf, Copyright 2006-2009, Wowza Media Systems, Inc., pp. 1-18.

"PKCS #11 v2.20: Cryptographic Token Interface Standard", RSA Laboratories, Jun. 28, 2004, pp. 1-391.

Nystroem, M., "Cryptographic Token Key Initialization Protocol (CT-KIP)", RSA Security, Nov. 2006, Version 1.0, Revision 1, The IETF Trust, pp. 1-55.

Jin et al., "Authentication Based on Signaling Token Piggybacking", Second International Workshop on Computer Science and Engineering, Oct. 28-30, 2009, IEEE Abstract, 2 pages.

Ono et al., "SIP Signaling Security for End-to-End Communication", The 9th Asia-Pacific Conference on Communications, Sep. 21-24, 2003 IEEE, vol. 3,, pp. 1042-1046.

Shrestha et al., "Kerberos Based Authentication Protocol with Improved Identity Protection in 3G Network", Pacific-Asia Conference on Circuits, Communications and Systems, May 16-17, 2009, IEEE Abstract, 2 pages.

* cited by examiner

TOKEN-BASED SECURITY FOR REMOTE RESOURCES

CROSS-REFERENCE TO RELATED APPLICATIONS

The present application is a continuation of and claims priority to U.S. patent application Ser. No. 14/630,334, filed Feb. 24, 2015, the content of which is incorporated by reference herein in its entirety.

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

Cloud computing is emerging as a viable alternative to "local" computing. For example, instead of purchasing computer hardware and software for a local database system, video transcoding system, etc., an enterprise may instead lease processing and storage resources from a cloud service provider. The cost of leasing cloud resources may be based on how much data is processed using the cloud resources, how often and/or for how long the cloud resources are used, how many devices access the cloud resources, etc. To control costs, an enterprise may desire to restrict access to cloud resources and other remote resources that the enterprise will be billed for.

SUMMARY

Systems and methods of token-based security for remote assets, such as cloud resources, are disclosed. A remote server (e.g., a cloud-based server) may include one or more assets to be accessed by a local server. The remote server may generate a short token (e.g., a six to eight character alphanumeric code) upon configuration of the one or more asset(s), and the short token may be displayed to a user (e.g., on a graphical user interface (GUI)). When the user inputs the short token into at the local server, the local server may use the short token to initiate a connection to the remote server. The short token may be a short-lived single-use token that is easy for the user to remember. The remote server may verify the short token and may provide a long token to the local server. For example, the long token may be a 32 or 64 character token that provides improved security as compared to the short token.

The local server may use the long token to communicate with the remote server. For example, the remote server may support an application programming interface (API). To request the remote server to perform specific operations, the local server may send a request in accordance with the API, where the request includes the long token. For example, each API request may be a hypertext transfer protocol (HTTP) secure (HTTPS) communication that includes the long token. The present application may provide a two-phase token-based authorization process for accessing remote computing resources (e.g., a cloud transcoder). Use of the described authorization process may enable an enterprise (or individual) to control who has access to the remote computing resources, providing the enterprise (or individual) increased control of the costs incurred during the use of such resources.

DETAILED DESCRIPTION

Figure 1:
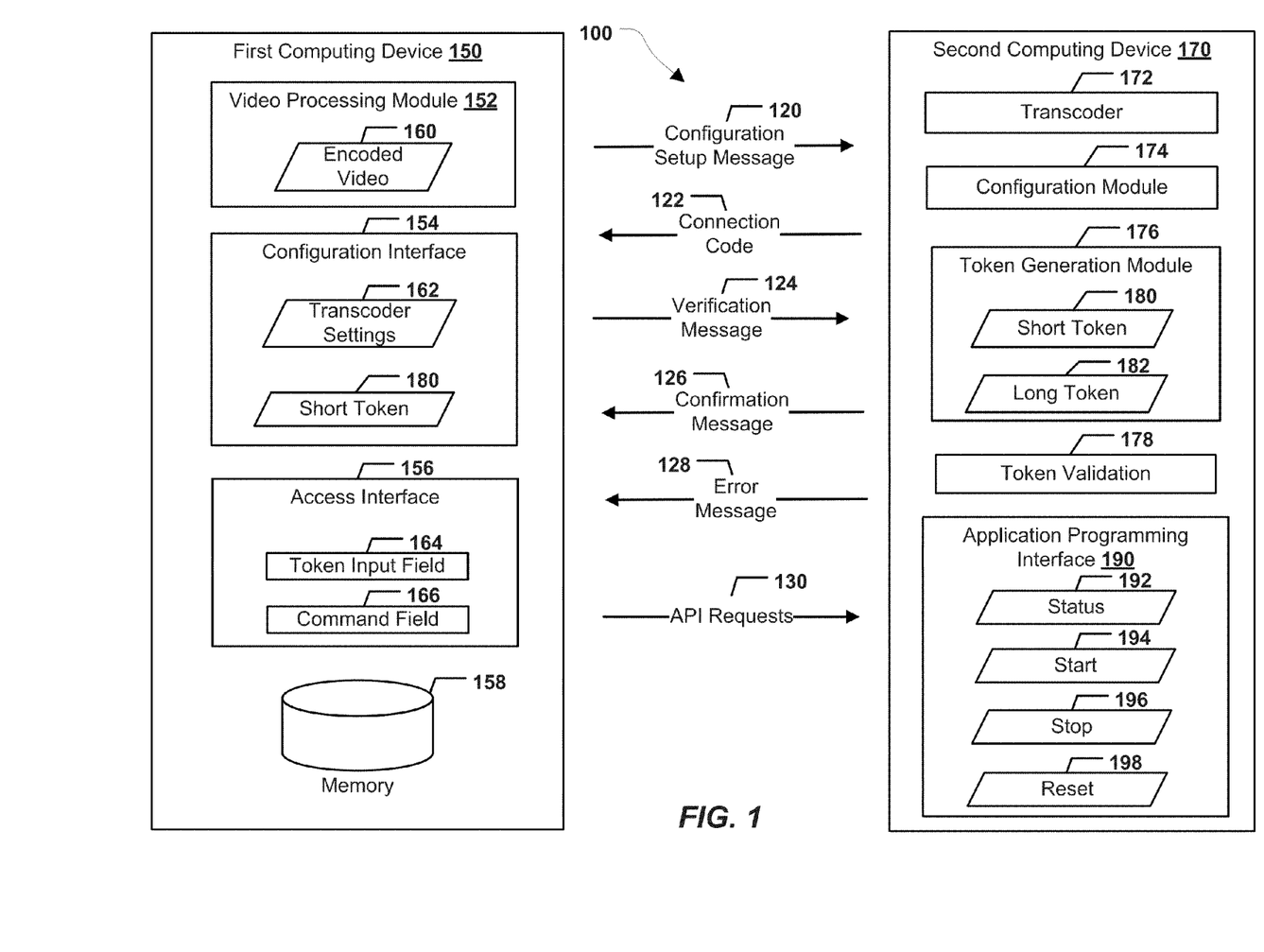
FIG. 1 is a block diagram of a particular embodiment of a system that is operable to implement token-based security for access to remote assets.

FIG. 1 is a block diagram of a particular embodiment of a system 100 that is operable to implement token-based security for access to remote assets. The system 100 includes a first computing device 150 and a second computing device 170. The first computing device 150 and the second computing device 170 may be remotely located with respect to each other and may be communicably coupled via a network (e.g., a local area network (LAN) and/or the Internet). In a particular embodiment, the first computing device 150 may be a server computing device configured to perform streaming (e.g., media server, encoder, internet protocol (IP) camera, video camera, etc.) functionality and the second computing device 170 may be a cloud-based computing device (e.g., a cloud-based server) that is configured to provide cloud computing resources, such as processing (e.g., video processing) and/or memory resources. Thus, it should be noted that in a cloud-based system, operations described with reference to the second computing device 170 may alternatively be performed by multiple computing devices in a cloud computing environment.

The first computing device 150 includes a video processing module 152 and a memory 158. The first computing device 150 is also configured to display (e.g., at a display device coupled to the first computing device 150) a configuration interface 154 and an access interface 156. The second computing device 170 includes a transcoder 172, a configuration module 174, a token generation module 176, and a token validation module 178. It should be noted that in alternative embodiments, the second computing device 170 may include resources other than a transcoder, such as content delivery network (CDN) resources and/or video streaming player resources, as illustrative non-limiting examples. The second computing device 170 may support receipt and processing of requests that are formatted in accordance with an application programming interface (API) 190. In an illustrative embodiment, the API 190 is a representational state transfer (REST) API. One or more components of the computing devices 150, 170 may correspond to hardware, software (e.g., instructions) executed by one or more processors, or a combination thereof.

The video processing module 152 may be configured to generate an encoded video 160 (e.g., streaming media content). The encoded video 160 may correspond to a live stream or a video on demand (VOD) stream, as further described with reference to FIG. 4. The video processing module 152 may include one or more encoders (not shown), one or more decoders (not shown), one or more transcoders (not shown), or any combination thereof. The encoders may encode data that is to be transmitted by the first computing device 150. For example, the encoders may encode video to generate the encoded video 160. The transcoders may be configured to perform bitrate conversion, encoder-decoder (CODEC) conversion, frame size conversion, etc. Depending on a format of a received stream, a playback format supported by a requesting device, and/or a transcoding parameter in use, a transcoding operation performed by the transcoders may trigger a decoding operation by the decoders and/or a re-encoding operation by the encoders. In a particular embodiment, the video processing module 152 enables the first computing device 150 to process data (e.g., video data) in accordance with multiple coding technologies and protocols.

The configuration interface 154 may enable a user of the first computing device 150 to configure a remote resource, such as a resource of the second computing device 170, such as the transcoder 172. For example, a user may input particular transcoder settings 162 using the configuration interface 154. In an illustrative embodiment, the configuration interface 154 is generated by the configuration module 174 and sent to the first computing device 150, where the configuration interface 154 is displayed in a web browser. Data input by the user into the configuration interface 154 may be sent back to the configuration module 174 at the second computing device 170 for use in provisioning and configuring the transcoder 172. Operations that may be performed when provisioning and configuring the transcoder 172 may include, but are not limited to, allocating/reserving processor and/or memory resources at the second computing device 170 (e.g., in a computing cloud) for execution of a software transcoder instance, establishing connection endpoints (e.g., HTTP connection endpoints) for the transcoder instance, etc.

To enable access control for the transcoder 172, the token generation module 176 at the second computing device 170 may generate a short token 180. In a particular embodiment, the short token 180 is formatted so that it is easy for a human to remember. The short token 180 may also be easily input at devices having a limited user input interface, such as a joystick or other keyboard-less input device. One example of such user input interfaces is an alphanumeric "soft keyboard" displayed by a set-top box or other computing device when alphanumeric input is requested (e.g., where the user uses up/down/left/right navigation buttons to select the alphanumeric characters). For example, the short token 180 may be a six to eight character alphanumeric code. The short token 180 may be displayed within the configuration interface 154. In a particular embodiment, the short token 180 is a "connection code" that enables communication with the transcoder 172. It will be appreciated, however, that because the short token 180 is easy to remember, the short token 180 may enable a user to more easily configure a computing device (e.g., the first computing device 150) to access the transcoder 172. However, the relatively small length of the short token 180 may make the short token 180 easier to generate in a brute force attempt to use the transcoder 172 without authorization. To reduce the chances of misuse, the short token 180 may be configured to expire within a particular time period after generation and/or after a single use. As a non-limiting example, the short token 180 may expire twenty-four hours after being generated.

To use the short token 180, a user may input the short token 180 into a token input field 164 of the access interface 156. For example, the access interface 156 may be a GUI that enables the user to set up a connection between the first computing device 150 and the transcoder 172, so that the first computing device 150 can send commands and/or data to the transcoder 172. As an illustrative non-limiting example, the video processing module 152 may generate the encoded video 160 as a high quality (e.g., high bitrate and/or high definition (HD) video stream). To support streaming of the encoded video 160 to devices having different bandwidths, screen resolutions, and processing capabilities, the first computing device 150 may send the encoded video 160 to one or more transcoders (e.g., the transcoder 172), where the transcoders generate different bitrate and/or resolution versions of the encoded video 160. The transcoders may also generate versions of the encoded video 160 that are compatible with different video streaming protocols.

When the user enters the short token 180 into the token input field 164, the short token 180 may be sent to the second computing device 170. The token validation module 178 may validate the short token 180. If the received short token 180 is invalid (e.g., not recognized, expired, already used, and/or scope mismatch), the second computing device 170 may provide an error message 128 to the first computing device 150. Alternatively, instead of providing a separate error message 128, the second computing device 170 may include the error information in a response payload of (a response to) the API request 130. Conversely, if the short token 180 is valid, the token generation module 176 may generate a long token 182. Alternatively, the long token 182 may have been generated at the same time as the short token 180. The long token 182 may be an alphanumeric code (e.g., a 32 character, 64 character, or longer alphanumeric code) that is more difficult to guess or generate in a brute force attack. In some examples, the long token 182 is generated using cryptographic or other security operations. In a particular embodiment, the long token 182 may be a hash of information to further validate the long token 182. In this embodiment, an unauthorized user may be able to guess or find a long token, but the long token would nonetheless be determined to be invalid (e.g., due to a scope mismatch). To illustrate, the long token 182 may be a hash of, may be generated using, and/or may be associated with information regarding an scope of use for the long token 182, where the scope identifies a specific resource, a specific user, a specific operation, a specific timeframe of use, and/or other scope information. When an unauthorized user attempts to use the long token 182, even though the long token 182 is recognized, the long token 182 may be determined to be invalid because the long token 182 is being used in a different scope. The long token 182 may "replace" the short token 180 for use in communicating with the transcoder 172. For example, after the short token 180 is initially used by the first computing device 150 to connect to the second computing device 170, the long token 182 may be provided to the first computing device 150 for use in all subsequent attempts to control the transcoder 172. For example, the first computing device 150 may include the long token 182 in one or more requests that are supported by the API 190 and that can be used to control operation of the transcoder 172 and/or enable retrieval of status information associated with the transcoder 172. In a particular embodiment, upon receiving the long token 182, the first computing device 150 stores the long token 182 in the memory 158.

During operation, the user may set up the transcoder 172 by inputting the transcoder settings 162 into the configuration interface 154. The transcoder settings 162 may include one or more of a transcoder instance name, an input and/or output video frame width, an input and/or output video frame height, a domain name, a stream uniform resource locator (URL), a stream name, an application name, a username/password, an input and/or output bitrate, an input and/or output streaming protocol, a maximum number of processors allowed for the transcoder 172, a maximum amount of memory usage allowed for the transcoder 172, a number of users or devices permitted to access the transcoder 172, etc. The transcoder settings 162 may be transmitted to the second computing device 170 in a configuration setup message 120.

Upon receiving the configuration setup message 120, the second computing device 170 may configure the transcoder 172 based on the transcoder settings 162. The second computing device 170 may also send the short token 180 to the first computing device 150 as a connection code 122.

To access the transcoder 172, the user may input the connection code 122 into the token input field 164 of the access interface 156. In an alternative embodiment, the connection code 122 may be input into a command line or into a configuration file, such as an extensible markup language (XML) file. The user may have a particular time period (e.g., twenty-four hours) to correctly input the connection code 122 into the token input field 164 before the connection code 122 expires. If the connection code 122 expires, the user may request the second computing device 170 to generate a new connection code. Regenerating another connection code may not change the long token 182, but may instead "pair" a new short token 180 with the long token 182.

After the connection code 122 is entered, the first computing device 150 may send the connection code 122 to the second computing device 170 in a verification message 124. In a particular embodiment, the verification message 124 may be a hypertext transfer protocol secure (HTTPS) message, supported by the API 190, that includes the connection code 122 in a "short token" field or argument. In an illustrative example, the verification message 124 is a POST command that provides the second computing device 170 the connection code 122 and instructs the second computing device 170 to return the long token 182 if the token validation module 178 determines that the connection code 122 is valid (e.g., matches the short token 180, has not expired, and has not previously been used). In a particular embodiment, the verification message 124 may include:
POST https://api.cloud.mediaserver.com/v1/token/[short_token]/validate/

If the connection code is invalid, the second computing device 170 may send an error message 128 to the first computing device 150, in response to which the first computing device 150 may prompt the user to reenter the connection code 122 into the token input field 164. Alternatively, if the connection code is valid, the second computing device 170 may respond to the verification message 124 with a confirmation message 126 that includes the long token 182. For example, the long token 182 may be a HTTP response payload of the above POST command:

```
{
    access_token: <long token>
}
```

The long token 182 may enable the first computing device 150 to reconfigure the transcoder 172, to set up publishing end points, and to perform other actions. To illustrate, after receiving the long token 182 via the confirmation message 126, the user may enter or select operations (e.g., in a command field 166) to be performed by the transcoder 172, where each such operation results in transmitting an API request 130. For example, the API requests 130 may be HTTPS GET commands, HTTPS PUT commands, HTTPS POST commands, etc. Each of the API requests 130 may include the long token 182 as part of a request URL and/or as part of a request payload. The long token 182 may be valid for the life of the transcoder 172. In a particular embodiment, each of the API requests 130 also includes an API key as part of an HTTPS header, where the API key enables use of the API 190. The API key may therefore be specific to a particular enterprise, customer, or vendor, whereas the short token 180 and the long token 182 may be specific to the particular instance of the cloud transcoder 172. In a particular embodiment, different API keys may be issued for sandbox (e.g., testing) and production access.

As a first illustrative non-limiting example, a first GET command may be used to retrieve characteristics of the transcoder 172 and information used to connect to the transcoder 172 and publish a stream:
GET https://api.cloud.mediaserver.com/v1/token/transcoders/[long_token]

The second computing device 170 may validate the first GET command by verifying that the [long_token] included in the first GET command exists and that the transcoder associated with the [long_token] belongs to an active/authorized user. The response payload of the first GET command may include connection information, characteristics, and publishing details for the transcoder 172:

```
{
    transcoder:
    {
        id: <transcoder id>,
        name: <transcoder name>,
        aspect_ratio_width: <width>,
        aspect_ratio_height: <height>,
        domain_name: <domain>,
        stream_url: <stream_url>,
        stream_name: <stream name>,
        application_name: <application name>,
        publish_username: <user>,
        publish_password: <password>,
        state: <state>
    }
}
```

As another illustrative non-limiting example, a second GET command may be used to receive status information regarding the transcoder 172:
GET https://api.cloud.mediaserver.com/v1/token/transcoders/[long_token]/status To validate the second GET command, the second computing device 170 may verify that the transcoder corresponding to the [long_token] exists. Upon determining that the second GET command is valid, the second computing device 170 may return a status 192 of the transcoder 172. The status 192 may indicate whether the transcoder 172 has started, has stopped, is in the process of starting, is in the process of resetting, etc. In a particular embodiment, the status 192 is included in a response payload of the second GET command:

```
{
    state: <started | starting | stopped, resetting>
}
```

As another illustrative non-limiting example, a first POST command may be used to start the transcoder 172 via a start API endpoint 194:
POST https://api.cloud.mediaserver.com/v1/token/transcoders/[long_token]/start
If the first POST command is valid (e.g., if the transcoder associated with the [long_token] exists), the transcoder 172 may start transcoding operations and generate output video stream(s). When successful, a response payload of the first POST command may be:

```
{
    state: <starting>
}
```

As another illustrative non-limiting example, a second POST command may be used to stop the transcoder 172 via a stop API endpoint 196:
POST https://api.cloud.mediaserver.com/v1/token/transcoders/[long_token]/stop
If the second POST command is valid (e.g., if the transcoder associated with the [long_token] exists), the transcoder 172 may stop transcoding operations and cease generating output video stream(s). When successful, a response payload of the second POST command may be:

```
{
    state: <stopped>
}
```

As another illustrative non-limiting example, a third POST command may be used to reset the transcoder 172 via a reset API endpoint 198:
POST https://api.cloud.mediaserver.com/v1/token/transcoders/[long_token]/reset
If the third POST command is valid (e.g., if the transcoder associated with the [long_token] exists), operation at the transcoder 172 may be reset to an initial/default state. When successful, a response payload of the third POST command may be:

```
{
    state: <resetting>
}
```

In a particular embodiment, a PUT command may be used instead of a POST command. For example, a PUT command may be used to access the start, stop, and reset API endpoints 194-198. In a particular embodiment, endpoints supported by the API 190 (e.g., endpoints corresponding to the verification message 124 and the API requests 130) return a HTTP 20X status code (where X=1, 2, 3, 4, 5, or 6) if valid/successful and error information in a response payload if invalid/unsuccessful.

The system 100 of FIG. 1 may thus provide token-based security for access to remote computing resources, such as the cloud transcoder 172. In particular, the system 100 of FIG. 1 combines the ease of use associated with the short token 180 with the increased resistance to brute force attacks provided by the long token 182.

Although the first computing device 150 is described above as a server computing device (e.g., local streaming engine) and the second computing device 170 is described above as a cloud-based server, it should be noted that the described token-based security methodology may also be used in alternative configurations and use cases. For example, in other embodiments, the first computing device 150 may be a media player configured to playback a media stream or a capture device configured to capture a media stream. Alternatively, or in addition, the second computing device 170 may be a local streaming engine or media server. The described systems and methods may thus be used to secure access to cloud-based resources as well as local computing resources.

It should also be noted that in alternative embodiments, more, fewer, and/or different functions described with reference to FIG. 1 as being performed by the second computing device 170 may instead be performed by an external server. As a non-limiting example, in some embodiments, the token generation module 176 may be executed by the external server but the token validation module 178 may be executed by the second computing device 170, or vice versa. Further, the token-based protection mechanism described herein may be independent of a protocol of a media stream sent to a transcoder or produced by a transcoder. That is, token-based security may be protocol agnostic and the same API 190 may be used to control the transcoder 172 regardless of the encoding and transport mechanisms used to send a media stream to the transcoder 172 or to receive a media stream from the transcoder 172. Thus, in a particular embodiment, the described techniques may be used for various media streaming protocols, including, but not limited to, real time messaging protocol (RTMP) (and variants thereof), real-time streaming protocol (RTSP), hypertext transfer protocol (HTTP), HTTP live streaming (HLS), HTTP dynamic streaming (HDS), smooth streaming, and motion picture experts group (MPEG) dynamic adaptive streaming over HTTP (MPEG-DASH).

Figure 2:
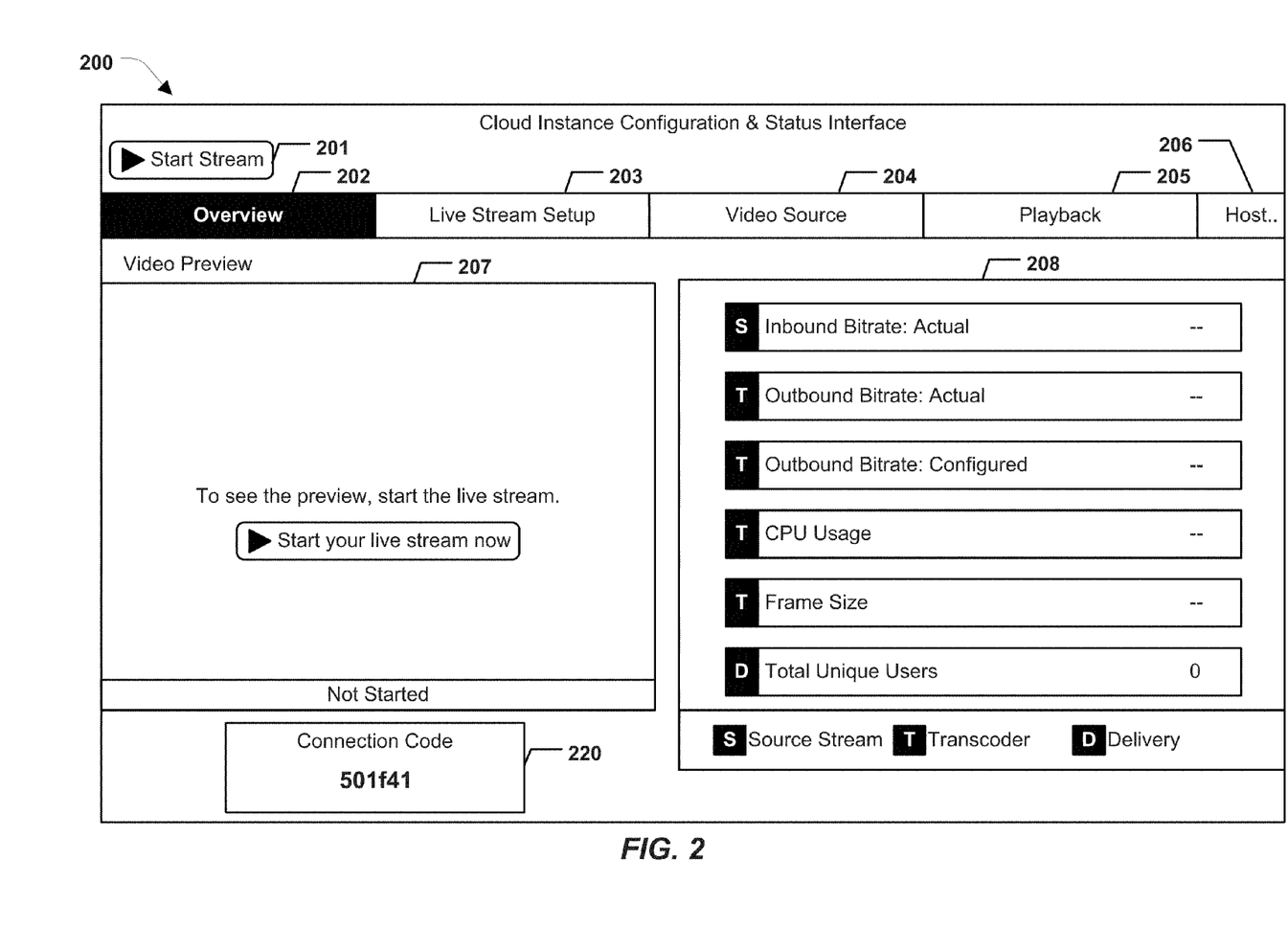
FIG. 2 is a diagram to illustrate a particular embodiment of a configuration interface that displays a short token that is usable to access remote assets.

Referring to FIG. 2, a particular illustrative embodiment of an interface 200 operable to configure a cloud transcoder instance is shown. In a particular embodiment, the interface 200 may correspond to the configuration interface 154 of FIG. 1.

In the example of FIG. 2, the interface 200 includes a start stream button 201 configured to initiate sending a stream to the cloud transcoder. The interface 200 is organized into multiple tabs 202-206, and in FIG. 2 an overview tab 202 is highlighted to indicate that the overview tab 202 has been selected by a user. The overview tab 202 includes a stream preview section 207. In the example of FIG. 2, the live stream has not yet been started, so the stream preview section 207 displays a "Not Started" message. The overview tab 202 further includes a status section 208 that displays status information associated with a source stream, the cloud transcoder instance, and/or stream delivery. Examples of such status information may include, but is not limited to, an inbound bitrate, an outbound bitrate (actual and/or configured), CPU usage, frame size, and total unique users (e.g., stream viewers).

The interface 200 further includes a connection code 220. In an illustrative embodiment, the connection code 220 may be generated by the token generation module 176 of FIG. 1 as described with reference to the short token 180 of FIG. 1. In the example embodiment of FIG. 2, the connection code 220 is "501f41," (i.e., a six character alphanumeric code). As described with reference to FIG. 1, a user may input the connection code to access the cloud transcoder instance associated with the interface 200. The connection code 220 may expire within a particular time period (e.g., 24 hours) after generation or after a single use. After expiration, the connection code 220 may no longer be displayed to the user via the interface 200. Instead, the interface 200 may be used to generate a new connection code (e.g., via the video source tab 204).

Although not shown in FIG. 2, the interface 200 may enable a user to select various options associated with a cloud transcoder instance. For example, a user may use the interface 200 to select a cloud service provider, a geographical location/region for the cloud transcoder instance, virtual machine parameters (e.g., operating system, number of virtual CPUs, amount of random access memory (RAM), amount of disk (e.g., solid state) memory, etc.), monitoring options, network/subnet options, software license keys, security settings (e.g., which protocols, internet protocol (IP) addresses, and ports are opened), logging options, cloud billing options and alerts, etc.

In a particular embodiment, the interface 200 can be accessed in a web browser by using an internet URL or IP address of the cloud computer executing the cloud transcoder instance. As an illustrative non-limiting example, if the IP address of the cloud computer is 54.200.220.235, then the interface 200 may be accessed using a specific port (e.g., port 8088) by a user navigating a web browser to 54.200.220.235:8088.

The interface 200 of FIG. 2 may thus enable a user to configure a cloud transcoder instance, view status information regarding the cloud transcoder instance, and generate/view a connection code (e.g., short token) that can be used to communicate with the cloud transcoder instance. The connection code may be easy for the user remember, may have a short time-to-live (TTL), and may be single-use to reduce the likelihood of a brute force attack. For example, as described with reference to FIG. 1, the connection code may be replaced with a longer token that is used during subsequent communication with the cloud transcoder instance.

Figure 3:
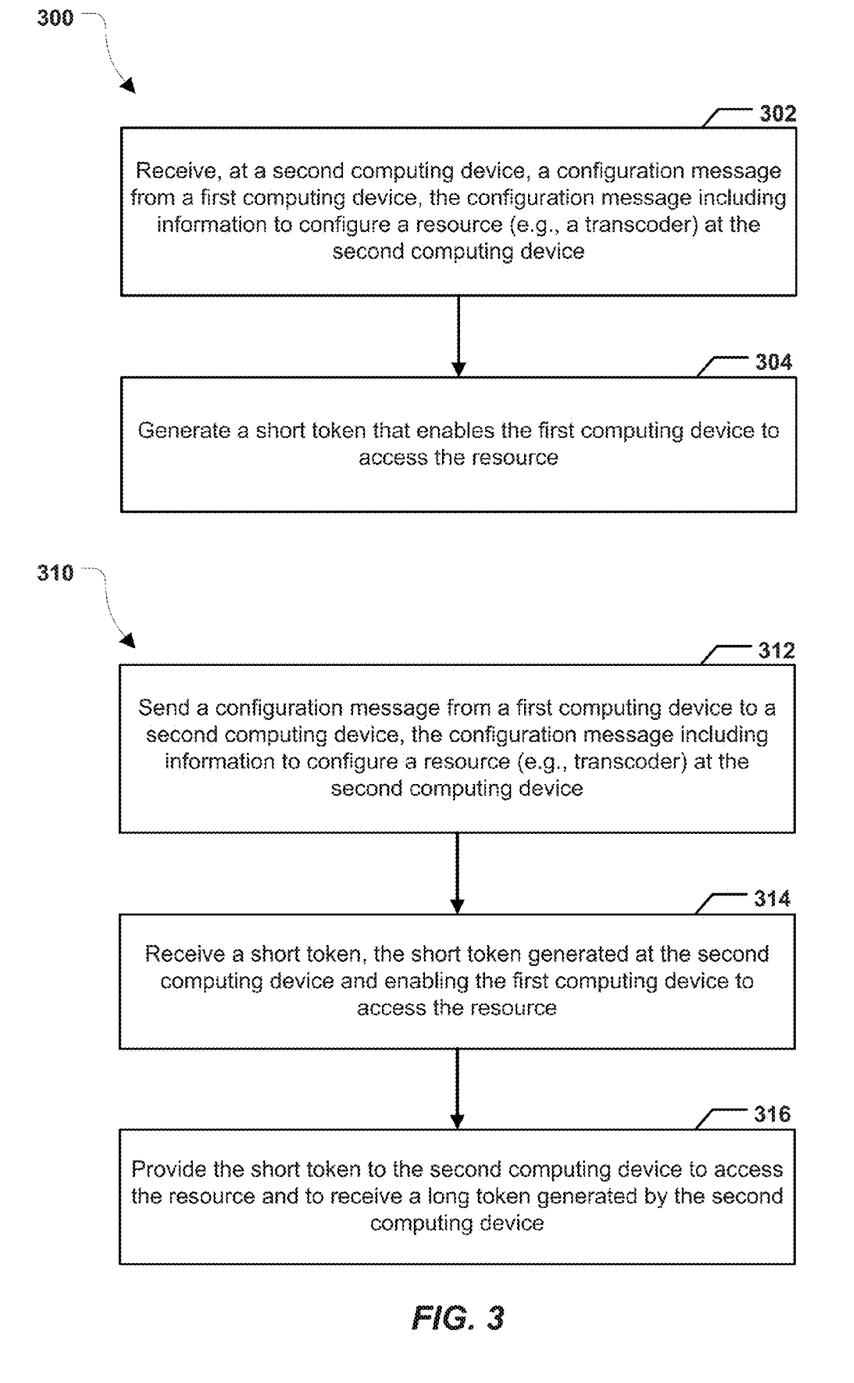
FIG. 3 includes flowcharts to illustrate particular embodiments of methods of operation of computing devices.

FIG. 3 includes flowcharts that illustrate particular embodiments of methods 300, 310 of operation at a computing device, such as the computing devices 150, 170 of FIG. 1.

A first method 300 includes receiving, at a second computing device, a configuration message from a first computing device, at 302. The configuration message may include information to configure a resource at the second computing device. For example, referring to FIG. 1, the configuration interface 154 of the first computing device 150 may transmit the transcoder settings 162 to the second computing device 170 using the configuration setup message 120. Upon receiving the configuration setup message 120, the second computing device 170 may configure the transcoder 172 based on the transcoder settings 162.

Advancing to 304, a short token may be generated (e.g., after configuration of the transcoder or other resource). For example, referring to FIG. 1, the token generation module 176 may generate the short token 180 (and optionally the long token 182). The short token 180 may be displayed at the configuration interface 154 as the connection code 122. The short token 180 may enable the first computing device 150 to access the transcoder 172, as described with reference to FIG. 1.

A second method 310 includes sending a configuration message from a first computing device to a second computing device, at 312. The configuration message includes information to configure a resource (e.g., a transcoder) at the second computing device. For example, referring to FIG. 1, the first computing device 150 may transmit the configuration setup message 120 to the second computing device, where the message 120 includes the transcoder settings 162.

Continuing to 314, a short token may be received, where the short token is generated at the second computing device and enables the first computing device to access the resource. For example, referring to FIG. 1, the short token 180 may be generated by the token generation module 176 and displayed at the configuration interface 154 as the connection code 122. The short token 180 may enable the first computing device 150 to access the transcoder 172.

The short token may be provided to the second computing device to access the resource and to receive a long token generated by the second computing device, at 316. For example, referring to FIG. 1, to access the transcoder 172, a user may input the connection code 122 (e.g., the short token 180) into the token input field 164 of the access interface 156. In a particular embodiment, the user may have a particular time period (e.g., twenty-four hours) to correctly input the connection code 122 into the token input field 164 before the connection code 122 expires. If the connection code 122 expires, the user may regenerate a new connection code via the configuration interface 154. The first computing device 150 send the code entered into the token input field 164 the second computing device 170 as part of the verification message 124. The token validation module 178 at the second computing device 170 may validate the connection code, and, if the connection code is valid, the second computing device may send the first computing device 150 the confirmation message 126 including the long token 182. The first computing device 150 may store the long token 182 in the memory 158 for subsequent use (e.g., for inclusion in the API requests 130 to enable the user to use the API 190, control the transcoder 172, retrieve status information associated with the transcoder 172, etc.). The methods 300, 310 of FIG. 3 may thus enable users to gain access to remote resources or assets, such as a cloud transcoder instance, by use of a short token and a long token.

Figure 4:
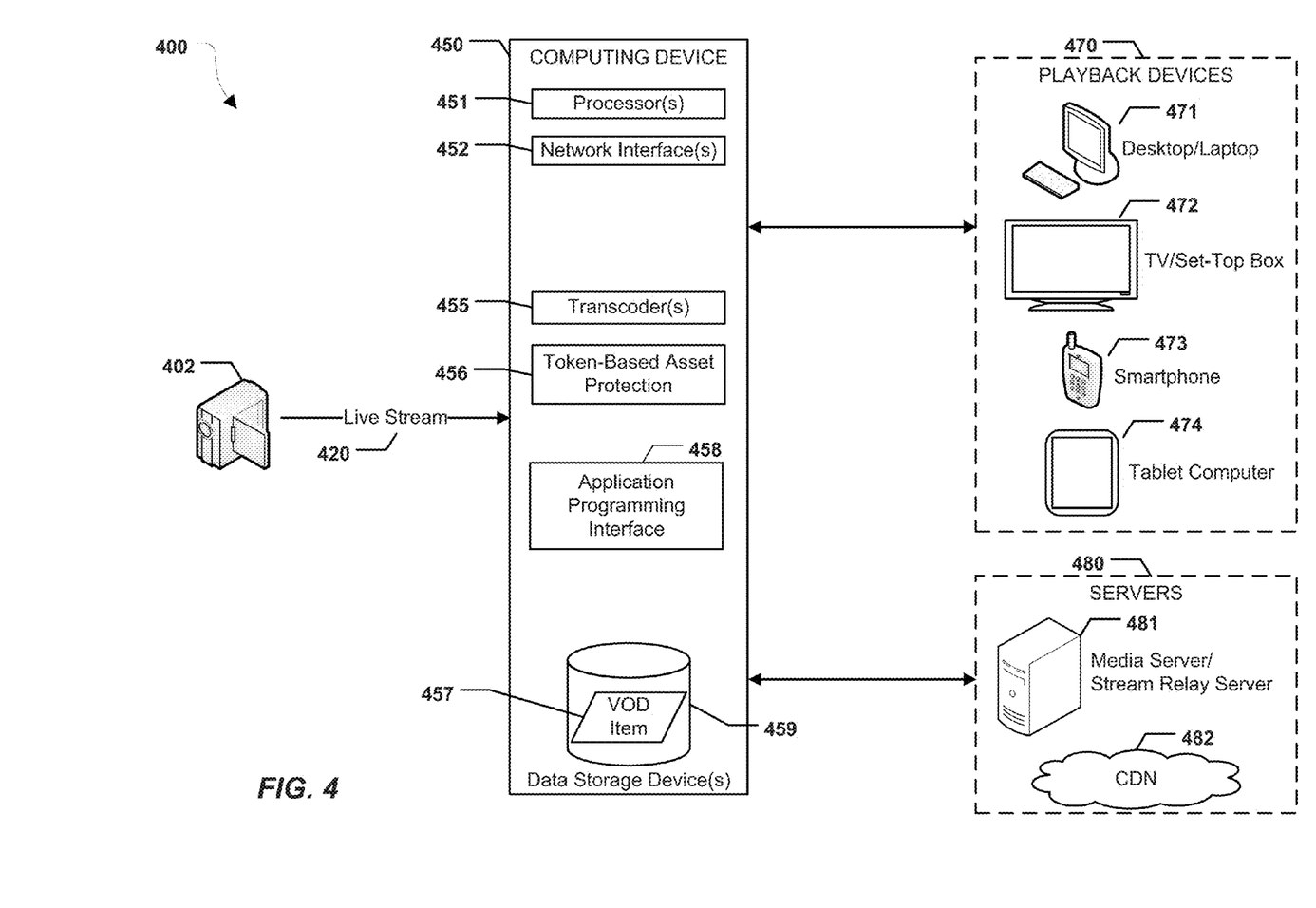
FIG. 4 is a block diagram of another particular embodiment of a system that is operable to implement token-based security for access to remote assets.

FIG. 4 is a diagram to illustrate another particular embodiment of a system 400 that is operable to support token-based security for access to remote assets. The system 400 includes a computing device 450 that is configured to send data to and receive data from various other devices (e.g., via a network, such as a local area network (LAN) or the Internet). For example, the computing device 450 may communicate with one or more playback devices 470 (e.g., devices that are configured to stream video content) and one or more other servers 480. In an illustrative embodiment, the computing device 450 may correspond to the second computing device 170 of FIG. 1. In a particular embodiment, the each playback devices 470 or the servers 480 may include to the first computing device 150 and/or a client device coupled to the first computing device 150. It should be noted that the illustrated playback devices 470 are examples. The playback devices 470 may include additional client devices and/or other types of devices capable of accessing webpages and/or playing media streams.

The computing device 450 may include one or more processors 451 and various components that are executable by the processor(s) 451. The computing device 450 may correspond to or include software application(s) that perform media serving or processing, hardware systems (e.g., servers) that support or perform media serving and processing, or any combination thereof. Thus, various operations described with reference to the computing device 450, or components thereof, may be implemented using hardware, software (e.g., instructions executable by the processor(s) 451), or any combination thereof.

The computing device 450 may include one or more network interfaces 452. For example, the network interface(s) 452 may include input interface(s) and output interface(s) that are configured to receive data and to send data, respectively. In a particular embodiment, the network interface(s) 452 may be wired and/or wireless interfaces that enable the computing device 450 to communicate data via a network, such as the Internet. For example, the network interface(s) 452 may include an Ethernet interface, a wireless interface compatible with an Institute of Electrical and Electronics Engineers (IEEE) 802.11 (e.g., Wi-Fi) protocol, or other wired or wireless interfaces.

The network interface(s) 452 may be configured to receive one or more media streams, such as an illustrative live media stream 420 from a capture source 402 (e.g., a camera) or a computing device that includes or is coupled to the capture source 402. In an illustrative embodiment, the capture source 402 may include or be coupled to the first computing device 150 of FIG. 1. The live media stream 420 may include audio data, video data, text data, closed captioning (CC) data, and/or subtitle data. The network interface(s) 452 may also be configured to transmit data to the one or more playback devices 470 (e.g., a smartphone, a tablet computer, a laptop computer, a desktop computer, a set-top box, a television, a portable media player, a game console, etc.). In the embodiment of FIG. 4, the playback devices 470 include a desktop/laptop computing device 471, a television (TV)/set-top box 472, a smartphone 473, and a tablet computer 474. The network interface(s) 452 may further be configured to transmit data to the one or more other servers 480 (e.g., a media server, a stream relay server, a server of a content distribution network (e.g., an edge server), etc.). In the embodiment of FIG. 4, the other servers 480 include a media server/stream relay server 481 and a server of a content distribution network (CDN) 482. In a particular embodiment, data transmitted to the playback devices 470 and to the servers 480 includes video streams. The video streams may be associated with the same encoding format and transmission protocol or may be associated with different encoding formats and transmission protocols. In a particular embodiment, generating the video streams includes performing video decoding, encoding, transcoding, and/or transmuxing operations at the computing device 450 (e.g., to modify a video encoding format, an audio encoding format, a bitrate, an aspect ratio, packaging, etc. relative to the incoming media stream 420). In a transmuxing operation, encoded audio and video may be repackaged without modifying the encoded audio and video.

The computing device 450 may include various components configured to perform stream processing functions. For example, the computing device 450 may include one or more video processing components, such as encoder(s), decoder(s), and/or transcoder(s) 455, each of which may be implemented using hardware, software, or both. In a particular embodiment, the transcoder(s) 455 may correspond to the transcoder 172 of FIG. 1. For example, the transcoder(s) 455 may be executed by cloud-based virtual machines. The transcoder(s) 455 may be configured to perform encoding, decoding, bitrate conversion, CODEC conversion, frame size conversion, etc. Depending on a format of a received stream, a playback format supported by a requesting device, and/or transcoding parameters in use, a transcoding operation performed by the transcoder(s) 455 may trigger a decoding operation and/or a re-encoding operation. In a particular embodiment, parameters used by the transcoder(s) 455 are stored in one or more transcoding templates at the computing device 450. The transcoder(s) 455 may thus enable the computing device 450 to process data in accordance with multiple coding technologies and protocols.

For example, the computing device 450 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The computing device 450 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The computing device 450 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The computing device 450 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The computing device 450 may include one or more data storage devices 459 (e.g., random access memory (RAM), disk-based storage, etc.). The data storage device(s) 459 may store stream data (e.g., frames of a live video stream), files, closed caption data, images (e.g., to be overlaid on top of a video stream), and other data. In a particular embodiment, the data storage device(s) 459 store a video on demand (VOD) item 457. The VOD item 457 may include audio data, video data, text data, closed captioning (CC) data, and/or subtitle data. For example, the VOD item 457 may be a movie or a television show. Alternately, the VOD item 457 may be stored remote from the computing device 450 and may be accessible by the computing device 450 via a network (e.g., the Internet).

The computing device 450 may also include a token-based asset protection module 456. In an illustrative embodiment, the token-based asset protection module 456 includes functions as described with reference to the token generation module 176 of FIG. 1 and/or the token validation module 178 of FIG. 1. In a particular embodiment, the computing device 450 may support adaptive streaming. For example, the computing device 450 may be configured to generate an adaptive streaming manifest. The manifest may include information describing adaptive bitrate renditions that are available for adaptive streaming To initiate an adaptive streaming session, a destination device (e.g., one of the playback devices 470) may request the manifest. Upon receiving the manifest, the destination device may determine which of the available renditions should be requested from the computing device 450. For example, the destination device may make such a determination based on buffering/processing capability at the destination device and/or network conditions (e.g., bandwidth) being experienced by the destination device.

Upon determining which rendition should be requested, the destination device may transmit a request to the computing device 450. The request may specify a particular portion (e.g., portion "X") of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition. Conversely, if playback and/or network conditions improve, the destination device may switch to a higher bitrate rendition. The computing device 450 may generate key frame aligned portions for the adaptive streaming renditions, so that switching to a lower bitrate or higher bitrate rendition appears "seamless" (e.g., does not result in noticeable visual glitches or dropped frames).

During operation, the computing device 450 may send a connection code to a computing device, such as a computing device associated with the capture source 402, one of the playback devices 470, or one of the servers 480. The connection code may be a relatively short alphanumeric token generated by the token-based asset protection module 456 and usable to communicate with one of the transcoder(s) 455. In a particular embodiment, the connection code may correspond to the connection code 122, the short token 180, and/or the connection code 220.

Upon receiving the connection code, a user may input the connection code into a designated field to generate a verification message that is transmitted to the computing device 450. In a particular embodiment, the verification message may correspond to the verification message 124 of FIG. 1. The token-based asset protection module 456 may verify whether the code entered by the user and included in the verification message matches the previously communicated connection code. If so, the computing device 450 may send a confirmation message to the user's computing device, where the confirmation message includes a long token (e.g., a longer "more secure" token) that is usable to send API requests supported by an API 458 at the computing device 450. In a particular embodiment, the confirmation message may correspond to the confirmation message 126, the long token may correspond to the long token 182, and the API requests may correspond to the API requests 130.

It should be noted that the orders of steps described with reference to FIGS. 1-4 are to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the first computing device 150 of FIG. 1, the second computing device 170 of FIG. 1, the computing device 450 of FIG. 4, the desktop/laptop computing device 471 of FIG. 4, the TV/set-top box 472 of FIG. 4, the smartphone 473 of FIG. 4, the tablet computer 474 of FIG. 4, the media server/stream relay server 481 of FIG. 4, a server (e.g., edge server) of the CDN 482 of FIG. 4, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes receiving, at a second computing device, a configuration message from a first computing device. The configuration message includes information to configure a resource (e.g., a transcoder) at the second computing device. The method also includes generating, at the second computing device, a short token that enables the first computing device to access the resource.

In another particular embodiment, an apparatus includes a processor and a memory storing instructions that are executable by the processor to perform operations. The operations include receiving a configuration message from a first computing device. The configuration message includes information to configure a resource at a second computing device. The operations also include generating a short token that enables the first computing device to access the transcoder.

In another particular embodiment, a non-transitory computer-readable medium includes instructions that, when executed by a processor, cause the processor to perform operations. The operations include receiving, at a second computing device, a configuration message from a first computing device. The configuration message includes information to configure a resource at the second computing device. The operations also include generating a short token that enables the first computing device to access the transcoder.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at a second computing device, a configuration message from a first computing device, the configuration message including information to configure a resource at the second computing device;
    generating, at the second computing device, a short token that enables the first computing device to access the resource; and
    generating, at the second computing device, a long token that enables the first computing device to access an application programming interface (API) supported by the second computing device, wherein the short token and the long token are sent from the second computing device to the first computing device.

2. The method of claim 1, wherein the resource comprises a transcoder.

3. The method of claim 1, wherein the long token is longer than the short token.

4. The method of claim 3, further comprising:
    sending the short token from the second computing device to the first computing device as a first connection code;
    receiving a second connection code from the first computing device; and
    sending the long token to the first computing device upon verification that the second connection code matches the first connection code.

5. The method of claim 1, wherein the short token expires a particular time period after being generated.

6. The method of claim 5, wherein the particular time period is twenty-four hours.

7. The method of claim 1, wherein the short token includes eight or fewer alphanumeric characters and the long token includes at least thirty-two characters.

8. The method of claim 1, wherein the first computing device includes a media server, wherein the second computing device includes a cloud-based server, and wherein the resource comprises a cloud computing resource.

9. The method of claim 1, wherein the first computing device is associated with a capture source, wherein the second computing device includes a cloud-based server, and wherein the resource comprises a cloud computing resource.

10. The method of claim 1, wherein the first computing device is associated with a capture source, wherein the second computing device includes a media server, and wherein the resource is provided by the media server.

11. An apparatus comprising:
    a processor; and
    a memory storing instructions executable by the processor to perform operations comprising:
        receiving a configuration message from a first computing device, the configuration message including information to configure a resource at a second computing device;
        generating, at the second computing device, a short token that enables the first computing device to access the resource; and generating, at the second computing device, a long token that enables the first computing device to access an application programming interface (API) supported by the second computing device, wherein the second computing device is configured to send the short token and the long token to the first computing device.

12. The apparatus of claim 11, wherein the operations further comprise:
receiving a message from the first computing device, wherein the message includes the short token; and
sending the long token to the first computing device in response to receiving the short token in the message, wherein the long token is longer than the short token.

13. The apparatus of claim 12, wherein the operations further comprise
processing an API request in response to determining that the API request includes the long token and that the long token is valid.

14. The apparatus of claim 13, wherein the message, the API request, or both are a hypertext transfer protocol (HTTP) secure (HTTPS) message.

15. The apparatus of claim 14, wherein the HTTPS message corresponds to a POST command, a PUT command, or a GET command.

16. The apparatus of claim 13, wherein the resource comprises a transcoder and wherein the API request is configured to retrieve characteristics of the transcoder, retrieve a status of the transcoder, start the transcoder, stop the transcoder, reset the transcoder, or any combination thereof.

17. A non-transitory computer-readable medium comprising instructions that, when executed by a processor, cause the processor to perform operations comprising:
receiving, at a second computing device, a configuration message from a first computing device, the configuration message including information to configure a resource at the second computing device;
generating, at the second computing device, a short token that enables the first computing device to access the resource;
generating, at the second computing device, a long token that enables the first computing device to access an application programming interface (API) supported by the second computing device, wherein the short token and the long token are sent from the second computing device to the first computing device.

18. The non-transitory computer-readable medium of claim 17, wherein the long token is longer than the short token.

19. The non-transitory computer-readable medium of claim 18, wherein the operations further comprise:
sending the short token from the second computing device the first computing device as a first connection code;
receiving a second connection code from the first computing device; and
sending the long token to the first computing device upon verification that the second connection code matches the first connection code.

* * * * *